United States Patent [19]
Will

[11] 3,783,713
[45] Jan. 8, 1974

[54] KICKDOWN ARRANGEMENT FOR A HYDRAULIC TRANSMISSION

[75] Inventor: Gerhard Will, Beutelsbach, Germany

[73] Assignee: Robert Bosch GmbH, Stuttgart, Germany

[22] Filed: Oct. 4, 1972

[21] Appl. No.: 294,889

[30] Foreign Application Priority Data
Oct. 9, 1971 Germany............P 21 50 468.7

[52] U.S. Cl. .................. 74/865, 74/867, 74/869, 74/752 A
[51] Int. Cl. .................. B60k 21/00, F16h 3/74
[58] Field of Search.................. 74/765, 767, 763, 74/757 A

[56] References Cited
UNITED STATES PATENTS
3,487,725 1/1970 Brunot.................. 74/752 A
3,727,487 4/1973 Forster et al. .................. 74/865

Primary Examiner—Arthur I. McKeon
Attorney—Michael S. Striker

[57] ABSTRACT

A kickdown arrangement for the hydraulic transmission of a motorcar includes an electrohydraulic transducer with a throttle valve operated by an electromagnet, and a control valve controlled by pressure fluid from the throttle valve, and producing a hydraulic kickdown signal when a predetermined maximum control pressure is reached upon full depression of the gas pedal. Both valves receive fluid under pressure from the outlet of a pump driven by the motor which drives the transmission. A servo main valve connects the outlet of the pump with the hydraulic transmission, and is controlled by a control flow from the outlet of the throttle valve.

5 Claims, 1 Drawing Figure

PATENTED JAN 8 1974 3,783,713
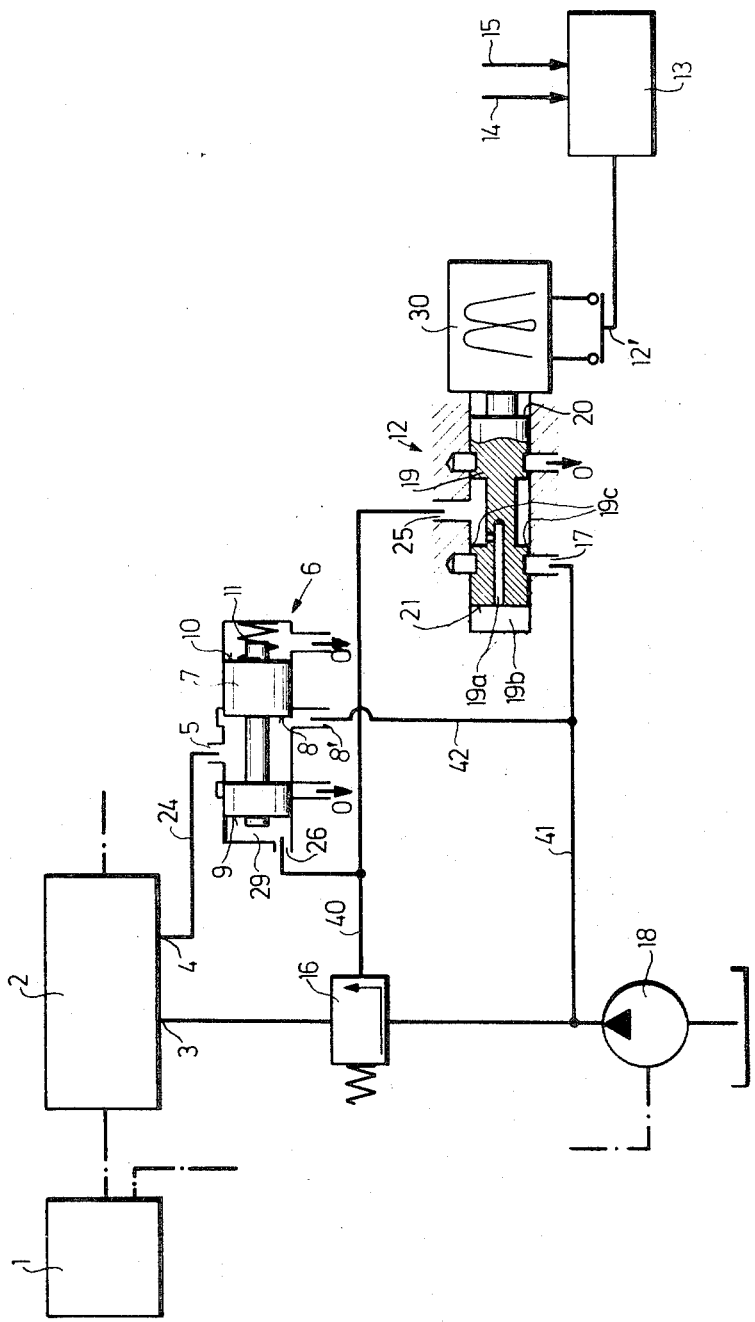

KICKDOWN ARRANGEMENT FOR A HYDRAULIC TRANSMISSION

BACKGROUND OF THE INVENTION

The present application is a continuation-in-part application of my copending application, Ser. No. 288,654 filed on or about Sept. 13, 1972, and entitled "Electrohydraulic Transmission Shifting Apparatus for a Motor Car."

The present invention relates to transmission shifting apparatus which has at each speed stage several hydraulic shifting means whose control pressure is determined by a servo main valve.

An automatic transmission shifting apparatus is known in which the transmission is shifted to the several speeds by a hydraulic auxiliary force. The pressure fluid is supplied to the respective hydraulic shifting means by a control valve, and a shifting pressure is set by a fluid controlled main valve. The control flow controlling the main flow of the main valve from the pump, is regulated by a throttle valve which is controlled by a membrane operated by the vacuum in the suction pipes of the combustion motor. In order to shift down during passing of another moving vehicle at high speed and great acceleration, a kickdown valve is provided which is mechanically connected with the gas pedal of the motorcar so that when the driver of the car floors the gas pedal, the kickdown valve permits the flow of pressure medium to the shifting means of the transmission so that the transmission is shifted back to the next lower speed.

In the apparatus of the prior art, a mechanically operated kickdown valve is required which is connected by a Bowden cable, or by a linkage with the gas pedal. The arrangement is expensive and requires very accurate assembly.

In my above entitled copending application, a pressure limiting valve cooperates with an electrohydraulic transducer so that a pressure fluid control flow limited by the pressure limiting valve is supplied to the servo main valve.

SUMMARY OF THE INVENTION

It is one object of the invention to provide a kickdown arrangement for a hydraulic transmission of a motorcar which has a simple construction and operates reliably.

Another object of the invention is to provide an automatic kickdown arrangement in which an electrohydraulic transducer, controlled by an electronic control means, automatically effects a downshift of the transmission upon full depression of the gas pedal.

An important object of the invention is to provide a kickdown control arrangement for an automatic hydraulic transmission in which the maximum pressure of the fluid controlling the servo valve, is used for the kickdown signal.

The arrangement of the invention has the advantage that the kickdown operation is not started at full load, and that it is extremely simple.

With these objects in view, the present invention provides an electronic control means responsive to a kickdown pedal operation to energize an electromagnet of an electrohydraulic transducer to operate a throttle valve to move to a position increasing the pressure of the pressure fluid control flow to the servo main valve, until a control flow flows at the highest pressure out of the throttle valve into a control valve and moves the control valve to a position permitting flow of pressure fluid through the outlet of the control valve to the transmission as a hydraulic kickdown signal actuating the transmission to shift down to the next lower speed stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic diagram illustrating an electrohydraulic kickdown arrangement according to the invention applied to a combustion motor.

DESCRIPTION OF THE PREFERRED EMBODIMENT

The drive motor or engine 1 of a motorcar drives an automatic hydraulic transmission 2 of known contruction, and also a rotary pump 18. The transmission 2 has for each speed stage, several hydraulically operable shifting means, which may include clutches and brakes for each speed. The hydraulic transmission 2 has two inlets 3 and 4 for hydraulic fluid, the first inlet 3 being connected with a servo main valve 16, and a second inlet 4 being provided for a hydraulic kickdown signal at a predetermined pressure. The inlet 4 of transmission 2 is connected by a conduit 24 with a control outlet 5 of a control valve 6.

An electrohydraulic transducer 12 includes an electromagnet 30, and a throttle valve 19 operated by the electromagnet 30 under the control of a switch 12' operated by electronic control means 13 which have means responsive to the speed of motor 1, and to the position of the foot pedal operated throttle of the motorcar.

The throttle valve 19 has valve inlet means 17 connected by conduit 41 with the outlet of pump 18, and valve outlet means 25 connected by conduit 40 with the servo main valve 16 for supplying to the main valve 16 a pressure fluid control flow influencing the flow of fluid from pump 18 through servo main valve 16 to the inlet 3 of transmission 2. A conduit 19a opens into a chamber 19b at one end of the valve slide piston 19 so that the control fluid pressure prevails in chamber 19b to urge valve slide piston 19 to the right as viewed in the drawing, provided that the electromagnet 30 is not energized.

The control valve 6 has a valve slide piston 7 biassed by a spring 11 acting on the end face 10 in one direction, the other end face 9 in an end chamber 29 receiving pressure fluid through the control inlet 26 which is connected with conduit 40 containing control fluid. The control valve also has an inlet 8' connected by conduits 42 and 41 with the outlet of pump 18. When piston 7 is displaced to the left as viewed in the drawing by spring 11, the inlet 8' is closed. Control valve 6 and throttle valve 19 also have discharge outlets 0 communicating with a container at low pressure.

The spring 11 of the control valve 6 produces a resilient force which remains the same during expansion or contraction of spring 11.

Throttle valve 19 of the electrohydraulic transducer 12 produces the control pressure by throttling the flow from inlet 17 to outlet 25 which communicates with the duct 19a and the end chamber 19b. The operation of the throttle valve slide of throttle valve 19 is effected by electromagnet 30 under the control of the electronic control means 13. The flow of fluid from inlet 17 to outlet 25 is throttled by a control edge 19c of the throttling valve slide piston 19.

The kickdown arrangement described above operates as follows:

It is assumed that the motorcar cruises along a highway without substantial acceleration for passing other cars. In this event, transmission 2 is shifted in accordance with the torque required of the motor which is transmitted to the electronic control means 13 in the form of a torque signal so that the electronic control means 13 operate the throttling valve 19. When a certain normal predetermined speed and number of revolutions of the motor is reached in each speed stage, the transmission shifts automatically to the next speed stage.

If the driver wants to accelerate the car for passing another car at maximum acceleration, the several transmission speed stages must be driven up to a higher number of revolutions at each speed stage. In order to obtain such an operation, the driver floors the gas pedal fully, that is beyond the pressure point indicating full load.

The electronic control means 13 receives a signal indicating the throttle position at 15, and indicating the motor speed at 14, and the electromagnet 30 is energized to shift the throttle valve 19 beyond the full load position to another position corresponding to a greater pressure of the control fluid flowing out of outlet 25. At the highest control pressure, the control edge 8 of the valve slide piston 7 of control valve 11 produces a kickdown signal in the form of fluid flowing from pump 18 through conduits 41, 42, inlet 8', outlet 5 through conduit 24 into the kickdown inlet 4 of the transmission. The hydraulic kickdown signal moves the shifting moment to a higher speed, and effects a downshift to the next lower speed of transmission 2. Since control valve 6 can produce a selected pressure, it is possible to supply the hydraulic kickdown signal directly to the hydraulic shifting means of the transmission. A special valve for adapting the shifting pressure is not required.

The operation is carried out in a correspondingly reversed sequence after a car has been passed, and the driver releases the gas pedal. Regular shifting operations of transmission 2 are from then on automatically carried out.

The apparatus of the invention is advantageous due to its great simplicity. If the control pressure used for the kickdown signal, and also the control pressures at which fluid is supplied to the servo main valve 16, should be raised only little above the full load position, it is necessary to tune electromagnet 30 of the electrohydraulic transducer 12, and also the electronic control means 13, exactly to the characteristics of the control valve 6.

From the above description, it will become apparent that the described embodiment comprises a pump 18; a servo main valve 16 connected between pump 18 and transmission 2, and being responsive to a pressure fluid control flow to provide shifting pressure for said transmission 2; an electrohydraulic transducer 12 including an electromagnet 30, and a throttle valve 19 operated by said electromagnet 30, said throttle valve 19 having valve inlet means 17 connected with said pump 18 and valve outlet means 25 connected with said servo main valve 16 for supplying thereto a pressure fluid control flow; a control valve 6 having a first control inlet 8' connected 42 with said pump 18, a second control inlet 26 connected 40 with said valve outlet means 25, and a control outlet 5 connected with said transmission 2, 4; and electronic control means 13 response to a kickdown pedal operation, 14, 15 to energize said electromagnet 30 to operate said throttle valve 19 to move to a position increasing the pressure of said pressure fluid control flow until a control flow at highest pressure flows through said valve outlet means 25 into said second control inlet 26 and moves said control valve 6 to a position permitting flow of pressure fluid through said control outlet 5 to said transmission 4, 2 as a hydraulic kickdown signal for actuating said transmission 2 to shift down to the next lower speed stage.

It will be understood that each of the elements described above, or two or more together, may also find a useful application in other types of kickdown arrangements for an automatic hydraulic transmission in a motorcar differing from the types described above.

While the invention has been illustrated and described as embodied in a kickdown arrangement for a hydraulic transmission including an electrohydraulic transducer with a throttle valve, and a control valve means for supplying a kickdown signal to the transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims. I claim:

1. Kickdown arrangement for a hydraulic transmission comprising a pump; a servo main valve connected between said pump and said transmission and being responsive to a pressure fluid control flow to provide shifting pressure for said transmission; an electrohydraulic transducer including an electromagnet, and a throttle valve operated by said electromagnet, said throttle valve having valve inlet means connected with said pump and valve outlet means connected with said servo main valve for supplying thereto a pressure fluid control flow; a control valve means having a first control inlet connected with said pump, a second control inlet connected with said valve outlet means, and a control outlet connected with said transmission; and electronic control means responsive to a kickdown pedal operation to energize said electromagnet to operate said throttle valve to move to a position increasing the pressure of said pressure fluid control flow until the control flow flows at the highest pressure through said valve outlet means into said second control inlet and moves said control valve to a position permitting flow of pressure fluid through said control outlet to said transmission as a hydraulic kickdown signal for actuating said transmission to shift down to the next lower speed stage.

2. Kickdown arrangement as claimed in claim 1 wherein said control valve means has a control valve slide piston having one end face forming a chamber in which said second control inlet is located so that the pressure of said control flow acts in said chamber to move said valve slide piston in one direction, said control valve means including a spring acting on the other end face of said valve slide piston and yielding to said maximum pressure so that said valve slide piston opens said control outlet and said first control inlet.

3. Kickdown arrangement as claimed in claim 1 wherein said throttle valve includes a throttle valve slide piston connected at one end with said electromagnet, and forming on the other end a chamber connected with said valve outlet means.

4. Kickdown arrangement as claimed in claim 1 comprising a motor for driving said transmission and said pump and being controlled by a pedal operated throttle; and wherein said electronic control meany include means responsive to the speed of said motor, and means responsive to the position of said throttle.

5. Kickdown arrangement as claimed in claim 1 wherein said control valve means has a control valve slide piston having one end face forming a chamber in which said second control inlet is located so that the pressure of said control flow acts in said chamber to move said valve slide piston in one direction, said control valve means including a spring acting on the other end face of said valve slide piston and yielding to said maximum pressure so that said valve slide piston opens said control outlet and said first control inlet; wherein said throttle valve slide piston is connected at one end with said electromagnet, and forming at the other end a chamber connected with said valve outlet means.

* * * * *